July 7, 1942. M. VAN WINKLE, JR 2,289,309

LOCK NUT

Filed Feb. 26, 1942

INVENTOR.
Marshall Van Winkle Jr.
BY
Brown & Seward
ATTORNEYS

Patented July 7, 1942

2,289,309

UNITED STATES PATENT OFFICE 2,289,309

LOCK NUT

Marshall Van Winkle, Jr., Leonia, N. J.

Application February 26, 1942, Serial No. 432,438

5 Claims. (Cl. 151—21)

This invention relates to a lock nut, and particularly such a nut of the type exemplified by U. S. Letters Patent to Place, No. 1,734,445, dated November 5, 1929.

An object of the invention is to provide such a nut which will fit freely upon a bolt so that it may be initially spun thereon up to a point of engagement with a fixed abutment, and which will thereafter be so deformed as to resist unscrewing at any point of the bolt whether engaged against an abutment or spaced therefrom.

A further object is to provide a nut having the above characteristics in which the bursting strength is not diminished.

Another object is to provide such a nut in which the amount of deformation may be accurately predetermined to meet any desired condition of use and reuse.

A further object is to provide certain improvements in the form, construction and arrangement of the several parts whereby the above and other objects may effectively be attained.

In the lock nut constructed according to the above mentioned patent to Place, a feature of importance in many practical applications resides in the fact that a strong locking effect is produced when the nut is screwed home against an abutment, while the nut undergoes no permanent deformation and may be removed from the bolt as freely as it was applied thereto. Extensive studies of this type of nut indicate that the locking effect is due to the pressure downward and outward on the top surfaces of the lower threads, which pressure, due to the fact that the bottom face of the nut engages an abutment only around the periphery of the nut, results in a cantilever action of the slotted upper parts of the nut causing these parts to move radially inward and bringing both the upper and lower surfaces of the nut threads into frictional engagement with the opposed surfaces of the bolt threads; this engagement serving effectively to lock the nut in place so long as its bottom surface is engaged against an abutment. The deformation of the nut as just described is not permanent and the nut returns to a free-fitting condition as soon as it is turned out of contact with the abutment.

For many purposes it is found to be desirable that a nut should resist rotation wherever it may be upon a bolt or threaded bar in the absence of any abutment, and the present invention is directed to a means for attaining this result effectively without sacrificing any of the other desirable characteristics of the Place type of nut.

A practical embodiment of the invention is represented in the accompanying drawing in which Fig. 1 represents a side elevation of the nut;

Figure 1:
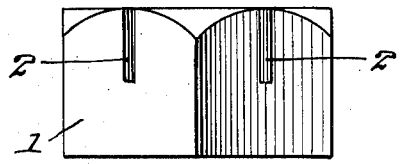

Referring to the drawing, the nut 1 is shown as being of the customary hexagonal shape, although the invention is intended to be applicable to nuts of other forms, such as square or octagonal. The nut is provided in its upper part with radial slots 2 uniformly spaced circumferentially, perpendicular to the vertical side faces of the nut and extending to a depth of approximately half the total height of the nut, thus dividing the upper half of the nut into sector-like castellations. The under surface or base of the nut is circularly dished to provide a recess 3 and to leave a narrow continuous bearing surface 4 around the periphery of the base. The bore of the nut is provided with the usual spiral threads 5.

Figure 2:
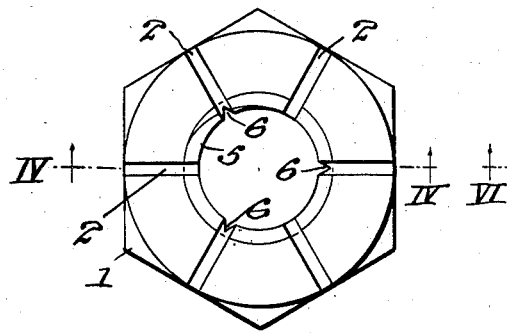
Fig. 2 represents a top plan view of one form of the nut.
Figure 5:
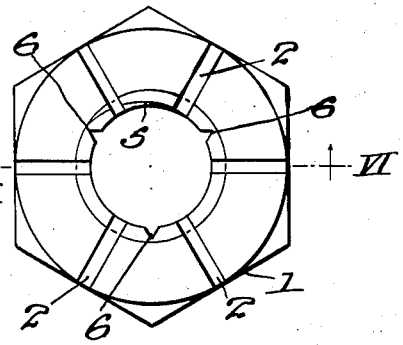
Fig. 5 represents a top plan view of a modified form of the nut.
Figure 3:
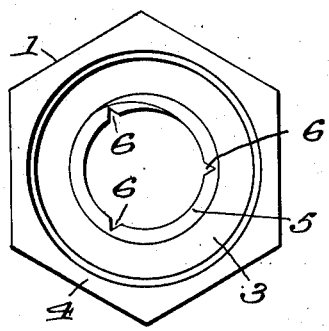
Fig. 3 represents a bottom plan view of the nut shown in Fig. 2.
Figure 6:
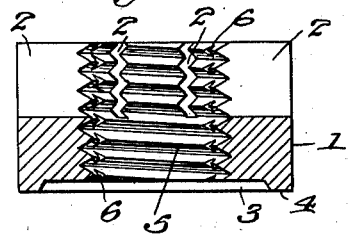
Fig. 6 represents a vertical section taken along the line VI—VI of Fig. 5 looking in the direction of the arrows.
Figure 4:
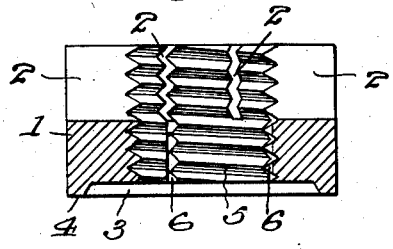
Fig. 4 represents a vertical section taken along the line IV—IV of Fig. 2 looking in the direction of the arrows.

The continuity of the threads 5 is interrupted by the provision of vertical grooves 6 which cut through the threads to a depth preferably of more than half the thread height but which do not extend radially into the body of the nut beyond the base of the threads. In the forms shown, three such grooves are provided, the grooves in Figs. 2, 3 and 4 being positioned circumferentially in the same axial planes as three of the slots 2; and the grooves shown in Figs. 5 and 6 being positioned circumferentially at points intermediate said slots. It will thus be seen that the grooves in Figs. 2, 3 and 4 extend in a vertical direction only from the bottom of the slots 2 to the base of the nut, while the grooves shown in Figs. 5 and 6 extend from the top of the nut to its base.

While it has proved most convenient to provide grooves having the number and position just described, desirable results can also be secured by providing a different number of grooves, preferably not less than two nor more than six, or by cutting the grooves spirally instead of vertically. It is believed that the most important function of the grooves is to interrupt the continuity of the threads in the lower part of the nut without weakening the shearing strength of the nut. The grooves 6 may be formed in any convenient manner, such as by broaching.

In the use of a nut constructed as described above it is found that the nut may be applied to a bolt or the like in any usual manner and that it may be spun down freely into engagement with an abutment. When further turning force is applied to the nut after its initial engagement it will lock against the threads of the bolt and will effectively resist forces of vibration and the like which would tend to loosen the engagement of an ordinary nut. Additionally, when the nut is forcibly unscrewed away from engagement with the abutment it will be found to have a permanent deformation sufficient to retain it in position at any point on the bolt or on any other bolt or threaded bar to which it may subsequently be applied. If the nut is to be used in a position where it cannot conveniently be given this permanent deformation in situ, the nut may be deformed in advance by screwing it firmly home against an abutment and then removing it for use wherever needed.

It has been found that the provision, in the Place type of nut, of small grooves which break the continuity of the threads without extending into the body of the nut, does not measurably decrease the shearing strength of the nut and does not impair the locking effect in cases where it is used against an abutment. It has also been found that the provision of such grooves in an ordinary nut without a slotted head and dished base has no effect whatever.

Studies of the action of the slotted and grooved nut described herein indicate that the permanent deformation takes place because the continuity of the lower threads of the nut is interrupted sufficiently to prevent these threads from acting as helical springs which tend normally to overcome the temporary distortion due to cantilever action in the Place type of nut. It is well known that substantially all the load is carried by the lower threads of a nut, and in the present case these threads are believed to deflect downwardly, while the cantilever action forces the upper threads into tight engagement with the bolt and progressively distributes the load to such upper threads. In the Place type of nut the lower threads are continuous and give the nut sufficient resiliency to prevent it from being permanently deformed, whereas the threads in the nut described herein are interrupted and so permit permanent deformation and a permanent increase in the thread surface area which is in effective frictional contact with the corresponding surfaces on the bolt. The foregoing explanation is based on careful studies, but the difficulty of ascertaining the true facts is such that no limitation of the invention is intended in the event that some other explanation may eventually be found. The fact is that the nuts disclosed act as set forth and that the result is a highly desirable one for many purposes.

Additionally, it is found that the degree of deformation may be accurately predetermined in accordance with the amount of force used to screw the nut initially against an abutment.

It will be apparent that various changes may be made in the construction, form and arrangement of the several parts without departing from the scope of my invention and hence I do not intend to be limited to the particular embodiment herein shown and described, but what I claim is:

1. A lock nut having a plurality of substantially vertical side faces, the upper end of said nut being divided by radial slots perpendicular to each of said faces to form sector-like portions or castellations equal in number to the number of faces, the base of said nut being dished to form a circular recess bounded by an annular peripheral bearing surface, said nut having a bore formed with a spiral thread of uniform depth, and said bore being provided with a plurality of grooves cut into said thread to a depth not less than half the thread height and not greater than said height.

2. A lock nut according to claim 1 in which the grooves in the thread extend in a direction perpendicular to the base of the nut.

3. A lock nut according to claim 1 in which the grooves in the thread extend in a direction perpendicular to the base of the nut and are located in axial planes which also pass through radial slots.

4. A lock nut according to claim 1 in which the grooves in the thread extend in a direction perpendicular to the base of the nut and are located in axial planes which lie intermediate radial slots.

5. A lock nut according to claim 1 in which the number of radial slots is not less than four nor more than eight and the number of grooves is not less than two nor more than six.

MARSHALL VAN WINKLE, Jr.